United States Patent [19]

Sandefur

[11] 4,179,840
[45] Dec. 25, 1979

[54] HANGING INSECTICIDE DRUM

[75] Inventor: Herbert G. Sandefur, Maud, Okla.

[73] Assignees: Kenneth Kienzle, Jr.; Gary Jay; John L. Clifton; Joe B. Womack, all of Shawnee, Okla.; part interest to each

[21] Appl. No.: 813,547

[22] Filed: Jul. 6, 1977

[51] Int. Cl.$^2$ .............................................. A01M 1/20
[52] U.S. Cl. ...................................... 43/131; 119/156
[58] Field of Search ................. 119/156, 106; 43/107, 43/132 R, 112, 113, 131

[56] References Cited

U.S. PATENT DOCUMENTS

| | | | |
|---|---|---|---|
| 1,848,614 | 3/1932 | Folmer | 43/112 |
| 1,862,325 | 6/1932 | Watson | 43/107 |
| 1,996,293 | 4/1935 | House | 43/107 X |
| 3,177,609 | 4/1965 | DeMarco | 43/112 |
| 3,799,118 | 3/1974 | Sandefur | 119/106 |

*Primary Examiner*—Harold D. Whitehead
*Attorney, Agent, or Firm*—Clarence A. O'Brien; Harvey B. Jacobson

[57] ABSTRACT

An insecticide containing insect attracting and exterminating drum is provided with structure for suspending the drum from the neck of a domestic animal or other suitable support structures. The drum includes an upwardly opening generally cup-shaped receiver closed at its bottom by a rigid fine mesh insect feeding and air circulating screen. A vertically upwardly and downwardly opening tubular insecticide container is mounted within the receiver with at least peripherally spaced wall portions of the container spaced inwardly from corresponding wall portions of the receiver and the lower end of the container formed integrally with the air circulating screen. In addition, certain peripherally spaced portions of the receiver are formed integrally with corresponding wall portions of the receiver and in this manner the receiver, air circulating screen and container coact to reinforce each other. A downwardly opening imperforate cover is loosely telescoped over the upper end of the receiver and removably supported therefrom and the center portion of the air circulating screen includes a depending stud from which a lower upwardly opening insect catching pan is supported. Further, a removably downwardly opening shield is supported from the cover and projects horizontally outwardly from all sides thereof.

3 Claims, 4 Drawing Figures

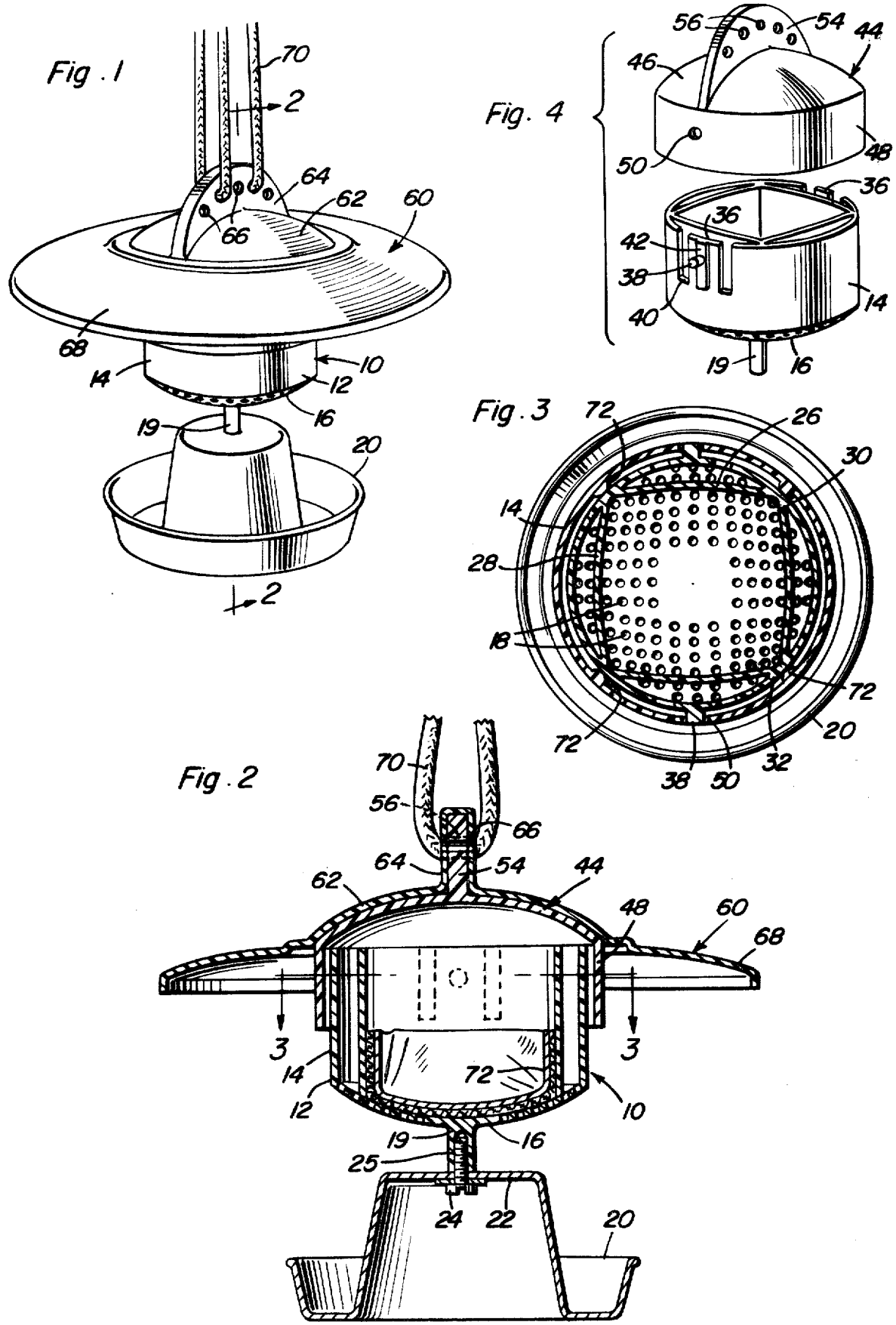

HANGING INSECTICIDE DRUM

BACKGROUND OF THE INVENTION

The hanging insecticide drum of the instant invention comprises an improvement over the insect exterminating drum disclosed in my prior U.S. Pat. No. 3,799,118. The present invention includes several features which constitute improvements over the drum disclosed in my above-mentioned prior patent. A first improvement feature resides in the provision of an upwardly opening insect and insecticide drop catching pan supported from a depending stud carried by the central portion of the lower air circulating screen of the upwardly opening insecticide receiver of the drum whereby insects attracted to the insecticide and air circulating screen and killed by the insecticide thereon may drop down into the pan rather than into food being consumed by a domestic animal wearing the drum or onto domestic housing floorings in which the insecticide drum is hung.

A second improvement of the instant invention resides in the provision of a downwardly opening shield removably secured over the downwardly opening cover extending over the receiver. The shield projects considerably horizontally outwardly from all sides of the drum and thereby protects the latter against excessive heating by the sun and impact thereon by rainwater.

A third improvement of the instant invention resides in the construction of the upwardly opening cup-shaped receiver section of the drum, the internal insecticide container within the drum and the air circulating and insecticide dispensing screen extending across the lower end of the receiver as well as the insecticide container. The screen, receiver and insecticide container are integrally formed and while one set of peripherally spaced wall portions of the internal insecticide container are spaced inwardly from corresponding wall portions of the cup-shaped receiver, a second set of peripherally spaced wall portions of the insecticide container are formed integrally with a corresponding second set of peripherally spaced wall portions of the upwardly opening cup-shaped receiver. Thus, the screen, receiver and insecticide container all coact with each other to provide reinforcement therefor.

The main object of this invention is to provide an insect attracting, insecticide containing and insect exterminating and disposing drum which will be capable of performing in an improved manner.

Another object of this invention is to provide a drum in accordance with the preceding object and constructed in a manner whereby structure is provided for catching insects exterminated by the insecticide contained within the drum.

Yet another object of this invention is to provide an insecticide containing an insect exterminating drum including an improved upper shield secured thereover whereby the drum will be shielded against the heat of the sun and will be protected against rain.

A final object of this invention to be specifically enumerated herein is to provide an insecticide containing an insect exterminating drum in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the improved insecticide containing an insect exterminating drum of the instant invention;

FIG. 2 is a vertical sectional view taken substantially upon the plane indicated by the section line 2—2 of FIG. 1 and on somewhat of an enlarged scale;

FIG. 3 is an enlarged horizontal sectional view taken substantially upon the plane indicated by the section line 3—3 of FIG. 2; and FIG. 4 is an exploded perspective view of the main components of the drum, for cows only.

DETAILED DESCRIPTION OF THE INVENTION

The improved insecticide drum of the instant invention is generally referred to by the reference numeral 10 and includes an upwardly opening cup-shaped receiver 12 including a cylindrical side wall 14 and an upwardly concave partial spherical bottom wall 16 formed integrally with the side wall 14. The bottom wall 16 has a plurality of closely spaced apart air circulating and insecticide dispensing openings 18 formed therethrough whereby the bottom wall 16 is transformed into an air circulating and insecticide dispensing screen structure. The central portion of the bottom wall 16 is imperforate and includes a central depending shank 19 formed integrally therewith.

An upwardly opening circular pan 20 is disposed in vertically spaced relation beneath the bottom wall 16 and includes an upwardly offset central bottom wall portion 22 upwardly through which a headed threaded fastener 24 is secured, the threaded shank of the fastener 24 being threaded into a downwardly opening blind core formed in the stud.

The receiver 12 further includes an internal upstanding tubular insecticide container 26 which is generally rectangular in cross-sectional shape. The lower end of the container 26 is formed integrally with the bottom wall 16 and the central portions of the generally straight side walls 28 of the container 26 are spaced inwardly from corresponding peripherally spaced portions of the cylindrical side wall 14 of the received 12. However, the corner portions 30 of the container 26 are formed integrally with corresponding peripherally spaced portions 32 of the side wall 14 of the receiver 12. In this manner, even though the side wall 14, bottom wall 16 and container 26 are constructed of plastic, the attachment of the corner portions 30 of the container 26 with corresponding wall portions of the side wall 14 of the receiver 12 and the integral attachment of the lower ends of the side walls 28 of the container 26 with the bottom wall 16 serve to provide bracing for these components.

Diametrically opposite portions of the side wall 14 and designated by the reference numerals 36 include integral outstanding pins 38 and the side wall 14 includes upwardly opening slots 40 formed therein on opposite sides of each of the portions 36. Thus, although the plastic of which the side wall 14 is formed is reasonably rigid, the side wall portions 36 are slightly inwardly deflectable. In addition, each of the side wall portions 36 includes an upstanding and outwardly projecting rib 42.

A downwardly opening cup-shaped cover referred to in general by the reference numeral 44 is provided and includes a downwardly concave domed top wall 46 from whose outer periphery a depending integral side wall 48 extends. Diametrically opposite portions of the side wall 48 include radial bores 50 formed therethrough and the cover is loosely telescopingly engageable downwardly over the receiver 12. By inward deflection of the wall portions 36, the pins 38 may be received within the diametrically opposite portions of the side wall 48 having the apertures of bores 50 formed therein and the pins 38 are registrable with and receivable in the apertures 50 whereby the cover 40 is securely removably fastened over the upwardly opening receiver 12.

The top wall 46 of the cover 44 includes an upwardly projecting support flange 54 having a plurality of rope accommodating holes 56 formed therein through which suspension rope sections may be passed in order to hang the drum 10 from a suitable support or about the neck of a domestic animal.

In addition, a downwardly opening shield referred to in general by the reference numeral 60 is provided and includes a central portion 62 which may closely overlie and be supported from the top wall 46. The central portion 62 includes an integral upwardly projecting and downwardly opening hollow lug 64 into which the flange 54 is snugly seatable and the lug 64 is provided with openings 66 formed therethrough registrable with the holes 56. In addition to the central portion 62, the shield 60 includes an outer peripheral portion 68 which projects considerably outwardly from all sides of the drum 10 and also outwardly beyond the outer periphery of the pan 20. Inasmuch as the bores or apertures 66 are registered with the holes 56, suspension ropes 70 may be passed through the registered apertures 66 and holes 56 in order to suspend the drum 10 from the neck of a domestic animal or from an elevated support such as a porch ceiling or tree limb.

In operation, an absorbent panel 72 is placed within the bottom of the container 26 with the panel 72 resting upon the upper surface of the bottom wall or insecticide dispensing screen 16. Thereafter, poison baits in the form of crystals, powder or pills may be placed within the container 26 and moistened lightly with pure distilled water. Thereafter, the cover 44 and shield 60 may be placed in position. The water applied to the poison bait transforms the latter into a syrup which soaks the absorbent panel 72 and "wicks" through the apertures 18 and onto the outer surfaces of the bottom wall or screen 16. The poison bait attracts insects to the screen and the insects are thereby exterminated and fall down into the pan 20 for collecting therein.

As hereinbefore set forth, the shield 60 serves to shield the drum 10 against excessive heating by the sun and also as a shield protecting the drum and the pan against rainwater.

The shield or rain cap 60 may be colored yellow or yellow and green and the drum 10 and pan 20 may be colored red or yellow for field use. In addition, the shield 60 may be white in color and the drum 10 may be red in color for use of the drum on house porches and the like for catching and exterminating flies. The panel or pad 72 controls drippage of the insecticide and the rib 42 as well as the internal ribs 72 carried by and spaced about the inner surfaces of the side wall 14 maintain the side walls 14 and 48 in spaced relation to further assist in preventing the drum 10 from being overheated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An insect attracting, insecticide containing and insect exterminating and disposing drum expressly adapted to be swingably hung and suspended from a suitable support, said drum comprising an upwardly opening cup-like receiver including upstanding peripheral wall portions and closed at its lower end by means of an upwardly opening perforated and partial spherical cotton wall extending between and formed integrally with said peripheral wall portions, the central portion of said bottom wall including a depending mounting shank, an internal upstanding tubular insecticide container disposed within said receiver, open at its upper and lower ends and including spaced peripheral wall portions spaced inwardly from opposing wall portions of said receiver for air circulation upwardly through said bottom wall, the spaces defined between opposing wall portions of said receiver and container, over the upper end of said container and downwardly through said container and the bottom wall inwardly of the receiver peripheral wall portions, a downwardly opening cover telescoped downwardly over the upper end of said receiver and removably anchored relative thereto, said cover including a top wall spaced above the upper end of said container, an upwardly opening insect and insecticide drop catching pan supported from the lower end of said stud, said pan including a bottom provided with a raised cental portion underlying at least the central portion of said bottom wall inwardly of said container peripheral portions, means removably anchoring said raised central portion to said stud with the lower end of said stud opposing said raised central portion, a downwardly opening shield having a central portion closely overlying, conforming to and supported from the upper surface of said cover and an outer peripheral portion extending about said shield central portion and projecting outwardly beyond all sides of said drum and said pan, said shield central portion including an upwardly projecting and downwardly opening hollow lug, said cover including an upwardly projecting hanger flange snugly removably received in said hollow lug, said hollow lug and hanger flange having registered rope accommodating horizontal openings formed therein.

2. The combination of claim 1 wherein said drum is made from rigid moldable plastic material, said rope being made of polyethylene and being of a length to aptly suspend and dangle the drum for effectually serviceable use.

3. The combination of claim 1 wherein said receptacle and container are integrally formed.

* * * * *